US012683859B2

(12) United States Patent
Jung et al.

(10) Patent No.: US 12,683,859 B2
(45) Date of Patent: Jul. 14, 2026

(54) RADIO ACCESS NETWORK MANAGEMENT APPLICATION CONFLICT COORDINATION

(71) Applicant: AT&T Intellectual Property I, L.P., Atlanta, GA (US)

(72) Inventors: Gueyoung Jung, Belle Mead, NJ (US); Matti Hiltunen, Morristown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 49 days.

(21) Appl. No.: 18/796,140

(22) Filed: Aug. 6, 2024

(65) Prior Publication Data

US 2026/0046204 A1 Feb. 12, 2026

(51) Int. Cl.
H04L 41/0813 (2022.01)
H04L 41/16 (2022.01)

(52) U.S. Cl.
CPC .......... H04L 41/0813 (2013.01); H04L 41/16 (2013.01)

(58) Field of Classification Search
CPC ........................... H04L 41/0813; H04L 41/16
See application file for complete search history.

(56) References Cited

U.S. PATENT DOCUMENTS

| 12,192,114 | B1 * | 1/2025 | Urie | ...................... H04L 47/748 |
| 2021/0096787 | A1 * | 4/2021 | Dozen | ................... G06F 9/4881 |
| 2023/0344717 | A1 * | 10/2023 | Cao | ........................ H04W 24/04 |
| 2024/0214272 | A1 * | 6/2024 | Ying | .................. H04L 41/0873 |
| 2024/0422622 | A1 * | 12/2024 | Grayson | .............. H04W 28/16 |
| 2025/0013734 | A1 * | 1/2025 | Abouzeid | .............. G06F 21/52 |
| 2025/0227027 | A1 * | 7/2025 | Bonati | ................ H04L 41/5009 |

* cited by examiner

*Primary Examiner* — Mohamed A. Wasel

(57) ABSTRACT

A processing system may receive a set of execution requests from a plurality of radio access network applications within a defined period of time, where each execution request of the set of execution requests is to perform at least one execution for configuring at least one aspect of a radio access network. The processing system may next identify at least one conflict among at least two of the plurality of radio access network applications. The processing system may then select, in response to identifying the at least one conflict, at least one modification to the set of execution requests in accordance with a reinforcement learning-based algorithm, and may perform at least a first execution associated with the set of execution requests according to the at least one modification to configure at least a first aspect of the radio access network.

20 Claims, 5 Drawing Sheets

| | Uplink Throughput | Downlink Throughput | Energy Consumption | Coverage | Spectral Efficiency |
|---|---|---|---|---|---|
| Uplink Throughput | 1 | 0.6 | -0.7 | 0.7 | 0.5 |
| Downlink Throughput | 0.6 | 1 | -0.8 | 0.7 | 0.8 |
| Energy Consumption | -0.7 | -0.8 | 1 | -0.7 | 0.3 |
| Coverage | 0.7 | 0.7 | -0.7 | 1 | 0.3 |
| Spectral Efficiency | 0.5 | 0.8 | 0.3 | 0.3 | 1 |

210

220

DL THROUGHPUT VS. COVERAGE

DL THROUGHPUT VS. UL THROUGHPUT

DL THROUGHPUT VS. ENERGY CONSUMPTION

COVERAGE VS. ENERGY CONSUMPTION

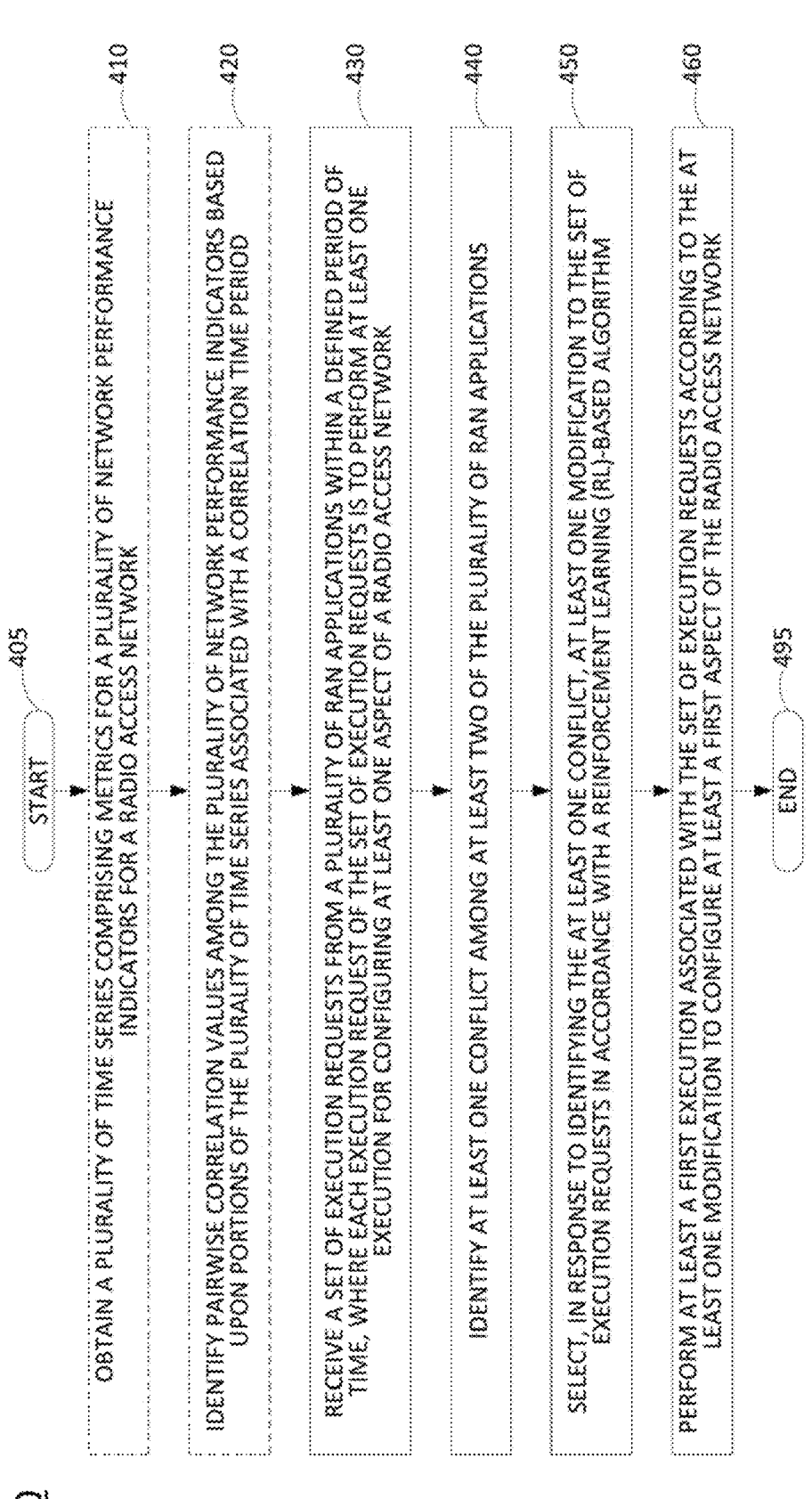

400

START 405

OBTAIN A PLURALITY OF TIME SERIES COMPRISING METRICS FOR A PLURALITY OF NETWORK PERFORMANCE INDICATORS FOR A RADIO ACCESS NETWORK — 410

IDENTIFY PAIRWISE CORRELATION VALUES AMONG THE PLURALITY OF NETWORK PERFORMANCE INDICATORS BASED UPON PORTIONS OF THE PLURALITY OF TIME SERIES ASSOCIATED WITH A CORRELATION TIME PERIOD — 420

RECEIVE A SET OF EXECUTION REQUESTS FROM A PLURALITY OF RAN APPLICATIONS WITHIN A DEFINED PERIOD OF TIME, WHERE EACH EXECUTION REQUEST OF THE SET OF EXECUTION REQUESTS IS TO PERFORM AT LEAST ONE EXECUTION FOR CONFIGURING AT LEAST ONE ASPECT OF A RADIO ACCESS NETWORK — 430

IDENTIFY AT LEAST ONE CONFLICT AMONG AT LEAST TWO OF THE PLURALITY OF RAN APPLICATIONS — 440

SELECT, IN RESPONSE TO IDENTIFYING THE AT LEAST ONE CONFLICT, AT LEAST ONE MODIFICATION TO THE SET OF EXECUTION REQUESTS IN ACCORDANCE WITH A REINFORCEMENT LEARNING (RL)-BASED ALGORITHM — 450

PERFORM AT LEAST A FIRST EXECUTION ASSOCIATED WITH THE SET OF EXECUTION REQUESTS ACCORDING TO THE AT LEAST ONE MODIFICATION TO CONFIGURE AT LEAST A FIRST ASPECT OF THE RADIO ACCESS NETWORK — 460

END 495

FIG. 4

RADIO ACCESS NETWORK MANAGEMENT APPLICATION CONFLICT COORDINATION

The present disclosure relates generally to wireless communication networks, and more particularly to methods, non-transitory computer-readable media, and apparatuses for implementing at least one modification to a set of execution requests from a plurality of radio access network functions in accordance with a reinforcement learning-based algorithm in response to identifying at least one conflict within the set of execution requests.

BACKGROUND

A cloud radio access network (RAN) is part of the 3$^{rd}$ Generation Partnership Project (3GPP) fifth generation (5G) specifications for mobile networks. As part of the migration of cellular networks towards 5G, a cloud RAN may be coupled to an Evolved Packet Core (EPC) network until new cellular core networks are deployed in accordance with 5G specifications. For instance, a cellular network in a "non-stand alone" (NSA) mode architecture may include 5G radio access network components supported by a fourth generation (4G)/Long Term Evolution (LTE) core network (e.g., an EPC network). However, in a 5G "standalone" (SA) mode point-to-point or service-based architecture, components and functions of the EPC network may be replaced by a 5G core network. Ultimately, 5G may deliver superior high speed and performance.

SUMMARY

In one example, the present disclosure discloses a method, computer-readable medium, and apparatus for implementing at least one modification to a set of execution requests from a plurality of radio access network functions in accordance with a reinforcement learning-based algorithm in response to identifying at least one conflict within the set of execution requests. For example, a processing system including at least one processor may receive a set of execution requests from a plurality of radio access network applications within a defined period of time, where each execution request of the set of execution requests is to perform at least one execution for configuring at least one aspect of a radio access network. The processing system may next identify at least one conflict among at least two of the plurality of radio access network applications. The processing system may then select, in response to identifying the at least one conflict, at least one modification to the set of execution requests in accordance with a reinforcement learning-based algorithm, and may perform at least a first execution associated with the set of execution requests according to the at least one modification to configure at least a first aspect of the radio access network.

BRIEF DESCRIPTION OF THE DRAWINGS

The teachings of the present disclosure can be readily understood by considering the following detailed description in conjunction with the accompanying drawings, in which:

FIG. 2 illustrates an example correlation table for several performance indicators associated with an example radio access network and an example graph indicating dependencies and conflicts over time for several performance indicators in an example radio access network, in accordance with the present disclosure;

FIG. 4 illustrates a flowchart of an example method for implementing at least one modification to a set of execution requests from a plurality of radio access network functions in accordance with a reinforcement learning-based algorithm in response to identifying at least one conflict within the set of execution requests.

To facilitate understanding, similar reference numerals have been used, where possible, to designate elements that are common to the figures.

DETAILED DESCRIPTION

Figure 1:
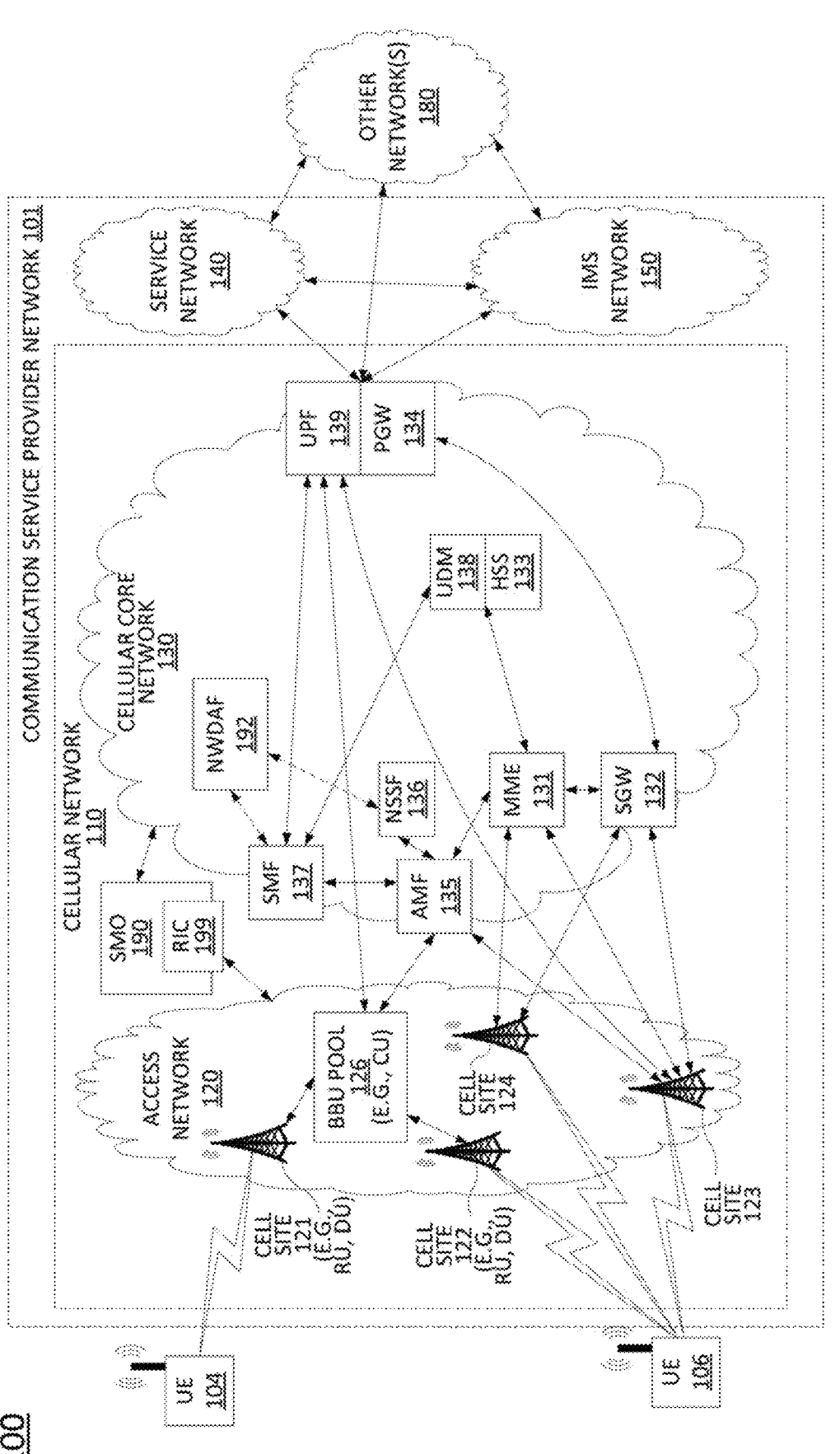
FIG. 1 illustrates a block diagram of an example system, in accordance with the present disclosure.

The present disclosure broadly discloses methods, computer-readable media, and apparatuses for implementing at least one modification to a set of execution requests from a plurality of radio access network functions in accordance with a reinforcement learning-based algorithm in response to identifying at least one conflict within the set of execution requests.

In particular, advancements in radio access network (RAN) technologies include application (app)-based automation, in which new applications, including third-party applications, may be deployed into a RAN operations platform over time. To achieve robust and reliable network automation with multiple applications, examples of the present disclosure identify and address conflicts among application-directed executions (e.g., changing various configurable RAN settings). In one example, applications may be developed internally by a network operator, but may also include 3$^{rd}$ party applications from equipment manufacturers or other vendors.

In accordance with the Open RAN (O-RAN) ecosystem, these applications may be broadly categorized as rApps (e.g., "non-real-time apps") and xApps (e.g., "near-real-time apps"). In accordance with the present disclosure, both xApps and rApps may be referred to as "RAN applications," "RAN apps," "applications," or simply "apps." These applications may undergo rigorous testing in a separate environment before integration into a live RAN. However, these applications may not be tested together (especially with respect to 3$^{rd}$ party RAN applications with internal logic that is unknown to other applications and to the network operator). Thus, predicting whether these RAN applications will work as expected in a common platform, and in target areas over time may be challenging. An existing approach using static/manually configured policy may not scale and may perform sub-optimally in a dynamic RAN environment. For instance, new RAN applications may be on-boarded over time and existing policy for RAN applications should be updated or deprecated to reflect new conflicts or dependencies with existing RAN applications.

To further illustrate, multiple RAN applications may aim to adjust the same parameters for RAN reconfiguration. Alternatively, or in addition, multiple RAN applications may target the same network performance indicators (e.g., which may be referred to as "key performance indicators" (KPIs)) in their goal functions. In another example, performance indicators adjusted by multiple RAN applications may directly or indirectly impact each other. In still another example, operations indicated by multiple RAN application may call for a specific sequence/order of operations to obtain expected and/or optimal results.

In general, RAN applications may aim to achieve optimal performance indicators values by adjusting RAN settings/configuration parameters. For example, a first RAN application may be designed to minimize energy consumption, while a second RAN application may be designed to maximize the downlink throughput. In an illustrative example, these RAN applications may adjust one or more of the same RAN settings attempting to achieve their respective goals. However, energy consumption and downlink throughput may have a directly negative relationship, indicating a conflict/potential conflict for a certain period of time, but not always. It should again be noted that a current approach to resolving such conflicts may primarily rely on static policy that is manually selected based on collaboration between application developers and/or one or more network operators. However, these types of conflicts may be dynamic over time. In addition, RAN application conflicts can exponentially increase while more RAN applications are deployed, e.g., into a RAN service management and orchestration (SMO) platform.

In accordance with the present disclosure, the intent of each RAN application can be directly or indirectly defined with one or more performance indicators (e.g., KPIs) in its goal function. For example, the intent of an area optimizer (AO) RAN application may be to maximize the uplink throughput, downlink throughput, and spectrum efficiency performance indicators, e.g., as described in its goal function. On the other hand, an automatic neighbor relations (ANR) RAN application may not have any specific performance indicators in its intent/goal function. Still, it may indirectly impact some performance indicators, such as: uplink and downlink throughputs, cell coverage, and spectrum efficiency because the ANR application's controlling behaviors may change the overall signal quality for endpoint devices (e.g., user equipment (UEs)). Nevertheless, most RAN applications may try to adjust RAN configuration parameters to achieve their goals, which may directly impact various performance indicators (whether indicated in a goal function or not). In any case, with these relations among intents, RAN parameters, and performance indicators, conflicts can be quantified and may be used to define a reinforcement learning (RL)-based reward (or penalty) function that may comprise target performance indicators and corresponding weight values for such performance indicators. The reward (or penalty) value can numerically indicate how RAN applications' executions avoid (or generate) conflicts.

For instance, an RL-based agent (e.g., comprising an RL-based algorithm, or model) may be trained to find an optimal policy to maximize the reward. The optimal policy guides the RL-based agent in selecting the optimal action among a set of possible actions for a given input state. In examples of the present disclosure, the input state can include various RAN parameters, such as: time variables (e.g., the time of day, day of the week, the month of the year), cell load conditions (e.g., physical resource block (PRB) utilization, transaction volume, the number of concurrent active UE connections, the number of UE handovers), signal conditions (e.g., channel quality information (CQI), reference signal received power (RSRP), reference signal received quality (RSRQ), signal to interference and noise ratio (SINR), physical downlink control channel (PDCCH) information, physical uplink control channel (PUCCH) information, and other input variables for various RAN applications. Selecting an action driven by the optimal policy may depend on which RAN application-requested executions, among a set of requested executions within a time window (e.g., one minute, two minutes, three minutes, five minutes, etc.) are chosen to execute, and how the selected requests can be executed. For instance, in accordance with the present disclosure, one or more requested executions (e.g., one or more requested changes to one or more configurable settings) for given RAN applications can be intentionally skipped or postponed, and/or the order of requested executions can be reordered for a set of execution requests from different RAN applications in the time window. Similarly, an RL-based agent may explore adjustments to the length of a time window within which to consider a set of executions that are requested by two or more RAN applications. For example, RAN application execution requests may be collected in a 1-minute queue, 2-minute queue, 3-minute queue, 5-minute queue, etc.

Thus, in accordance with the present disclosure, an RL-based agent (e.g., a program or set of programs operating on the RAN SMO platform) may explore these types of modifications, and learn which modifications may lead to overall improvements in RAN performance. Using a trained RL-based agent, the present disclosure may then process sets of RAN application execution requests, and may select to skip or postpone certain executions. In particular, an RL-based agent may measure the reward value resulting from each action and record the value. Once it collects enough samples (e.g., the RAN state, corresponding chosen action, and reward value), the RL-based agent can see which action is better for a given state than others. Thus, an optimal policy may be built/trained into the RL-based agent using the collected data. However, it should be noted that in some examples, a default ordering of execution requests (e.g., in the order received, or in accordance with the execution times as requested by the respective RAN applications) may still be found to be an optimal course of action. In other words, the RL-based agent may learn that no modification leads to an optimal overall RAN performance for certain RAN states and respective sets of execution requests.

In one example, an RL-based algorithm implemented by the RL-based agent may be trained in a supervised/semi-supervised manner. For instance, the RL-based agent may refine an RL-based algorithm via exploration, but beginning with an initial policy, which may continue to be enhanced at runtime, e.g., through ongoing reinforcement learning. For instance, an initial policy may guide the RL-based agent in narrowing down the choices of possible action trials, and may therefore reduce the risk of reduced performance that may result from random trials. In one example, an initial policy may be guided by correlations between performance indicators learned from historical data. In one example, historical data may also indicate how the correlations may change over time. In one example, using the historical data (and in some examples using initial observations at runtime), RL exploration may be implemented via one or more network simulation tools. In one example, data collected from simulations can also be tested and validated at runtime (e.g., in a live RAN and/or in a physical simulation in a test RAN environment).

To further illustrate, an RL-based agent of the present disclosure may implement an RL-based algorithm having a general methodology as follows. In a first stage, the RL-based agent may track RAN application execution requests (and/or execution performance) to learn default behaviors for execution sets (e.g., no modifications) and corresponding reward values. As noted above, default execution sets may sometimes be optimal. Therefore, it is useful to continue to record performance data for default execution sets. In a second stage, e.g., a "try-and-observe" stage, the RL-based agent may explore modifications and collect performance data. In one example, the RL-based agent may be configured to implement a heuristic approach that incrementally increases the degree of change of action, e.g., from conservative modifications (such as short delays of request executions) to more aggressive modifications (e.g., longer delay, omitting executions completely, omitting executions for multiple RAN applications, etc.). Similarly, for the selection of the length of a time window, the RL-based agent may start conservatively, e.g., one-second to much longer, e.g., 10 minutes, 20 minutes, or the like. However, in one example, the RL-based exploration of modifications may be constrained by guidelines from network personnel, RAN hardware providers, and/or RAN application providers having technical experience to narrow down the exploration only to reasonable choice of actions. In one example, the RL-based agent may consider modifications for execution sets in which there is a conflict, e.g., between performance indicators that are negatively correlated with each other, between requested executions targeting the same performance indicator, or between requested executions that seek to tune/adjust the same configurable RAN setting.

In a third phase, the RL-based agent may be observed to converge to an optimal policy (e.g., exploratory changes do not lead to further improvements). In this phase, RL-based exploration may be ramped down. However, in one example, RL-based exploration may not cease entirely. For instance, to avoid confirmation bias and to not miss opportunities to further the reward value, additional RL-based exploration may be initiated from time to time, e.g., periodically or otherwise. In one example, the RL-based agent may implement a Q-table-based RL algorithm. For instance, in such an example, once the Q-table converges to an optimal policy (e.g., even with new trials, it does not improve the reward values), the frequency of trials may be reduced. In one example, in a later phase, the RL-based agent may also be extended to build a more resource-intense RL model (e.g., a deep Q neural network model, or the like), e.g., from all or a portion of the previously collected data and/or new data from additional explorations. In one example, a neural network-based model may also fill gaps in the Q-table through interpolation (e.g., in case that Q-table is not dense enough or is coarse-grained by the discretization). These and other aspects of the present disclosure are discussed in greater detail below in connection with the examples of FIGS. 1-5.

To better understand the present disclosure, FIG. 1 illustrates an example network, or system 100 in which examples of the present disclosure may operate. In one example, the system 100 includes a communication service provider network 101. The communication service provider network 101 may comprise a cellular network 110 (e.g., a 4G/Long Term Evolution (LTE) network, a 4G/5G hybrid network, or the like), a service network 140, and an IP Multimedia Subsystem (IMS) network 150. The system 100 may further include other networks 180 connected to the communication service provider network 101.

In one example, the cellular network 110 comprises an access network 120 and a cellular core network 130. In one example, the access network 120 comprises a cloud RAN. For instance, a cloud RAN is part of the 3GPP 5G specifications for mobile networks. As part of the migration of cellular networks towards 5G, a cloud RAN may be coupled to an Evolved Packet Core (EPC) network until new cellular core networks are deployed in accordance with 5G specifications. In one example, access network 120 may include cell sites 121 and 122 and a baseband unit (BBU) pool 126. In a cloud RAN, radio frequency (RF) components, referred to as remote radio heads (RRHs), may be deployed remotely from baseband units, e.g., atop cell site masts, buildings, and so forth. In an Open RAN (O-RAN) architecture, these may alternatively or additionally be referred to as and/or may include radio units (RUs) (also referred to as O-RUs) and/or distributed units (DUs). In one example, the BBU pool 126 may be located at distances as far as 20-80 kilometers or more away from the antennas/remote radio heads of cell sites 121 and 122 that are serviced by the BBU pool 126. In an O-RAN architecture, these may alternatively or additionally be referred to as and/or may include centralized units (CUs). It should also be noted in accordance with efforts to migrate to 5G networks, cell sites may be deployed with new antenna and radio infrastructures such as multiple input multiple output (MIMO) antennas, and millimeter wave antennas. In this regard, a cell, e.g., the footprint or coverage area of a cell site may in some instances be smaller than the coverage provided by NodeBs or eNodeBs of 3G-4G RAN infrastructure. For example, the coverage of a cell site utilizing one or more millimeter wave antennas may be 1000 feet or less.

Although cloud RAN and or O-RAN infrastructure may include distributed units (DUs), radio units (RUs)/RRHs and centralized units (CU), e.g., baseband units (BBUs), a heterogeneous network may include cell sites where RRH and BBU components (or CUs, DUs, and RUs) remain co-located at the cell site. For instance, cell site 123 may include RRH and BBU components (or an RU, DU, and CU). Thus, cell site 123 may comprise a self-contained "base station." With regard to cell sites 121 and 122, the "base stations" may comprise RRHs at cell sites 121 and 122 coupled with respective baseband units of BBU pool 126. In accordance with the present disclosure, any one or more of cell sites 121-123 may be deployed with antenna and radio infrastructures, including multiple input multiple output (MIMO) and millimeter wave antennas.

In one example, access network 120 may include both 4G/LTE and 5G radio access network infrastructure. For example, access network 120 may include cell site 124, which may comprise 4G/LTE base station equipment, e.g., an eNodeB. In addition, access network 120 may include cell sites comprising both 4G and 5G base station equipment, e.g., respective antennas, feed networks, baseband equipment, and so forth. For instance, cell site 123 may include both 4G and 5G base station equipment and corresponding connections to 4G and 5G components in cellular core network 130. Although access network 120 is illustrated as including both 4G and 5G components, in another example, 4G and 5G components may be considered to be contained within different access networks. Nevertheless, such different access networks may have a same wireless coverage area, or fully or partially overlapping coverage areas.

In one example, the cellular core network 130 provides various functions that support wireless services in the LTE environment. In one example, cellular core network 130 is an Internet Protocol (IP) packet core network that supports both real-time and non-real-time service delivery across a LTE network, e.g., as specified by the 3GPP standards. In one example, cell sites 121 and 122 in the access network 120 are in communication with the cellular core network 130 via baseband units in BBU pool 126.

In cellular core network 130, network devices such as Mobility Management Entity (MME) 131 and Serving Gateway (SGW) 132 support various functions as part of the cellular network 110. For example, MME 131 is the control node for LTE access network components, e.g., eNodeB aspects of cell sites 121-123. In one embodiment, MME 131 is responsible for UE (User Equipment) tracking and paging (e.g., such as retransmissions), bearer activation and deactivation process, selection of the SGW, and authentication of a user. In one embodiment, SGW 132 routes and forwards user data packets, while also acting as the mobility anchor for the user plane during inter-cell handovers and as an anchor for mobility between 5G, LTE and other wireless technologies, such as 2G and 3G wireless networks.

In addition, cellular core network 130 may comprise a Home Subscriber Server (HSS) 133 that contains subscription-related information (e.g., subscriber profiles), performs authentication and authorization of a wireless service user, and provides information about the subscriber's location. The cellular core network 130 may also comprise a packet data network (PDN) gateway (PGW) 134 which serves as a gateway that provides access between the cellular core network 130 and various packet data networks (PDNs), e.g., service network 140, IMS network 150, other network(s) 180, and the like.

The foregoing describes long term evolution (LTE) cellular core network components (e.g., EPC components). In accordance with the present disclosure, cellular core network 130 may further include other types of wireless network components e.g., 2G network components, 3G network components, 5G network components, etc. Thus, cellular core network 130 may comprise an integrated network, e.g., including any two or more of 2G-5G infrastructures and technologies, and the like. For example, as illustrated in FIG. 1, cellular core network 130 further comprises 5G components, including: an access and mobility management function (AMF) 135, a network slice selection function (NSSF) 136, a session management function (SMF), a unified data management function (UDM) 138, a user plane function (UPF) 139, and a network data analytics function (NWDAF) 192.

In one example, AMF 135 may perform registration management, connection management, endpoint device reachability management, mobility management, access authentication and authorization, security anchoring, security context management, coordination with non-5G components, e.g., MME 131, and so forth. NSSF 136 may select a network slice or network slices to serve an endpoint device, or may indicate one or more network slices that are permitted to be selected to serve an endpoint device. For instance, in one example, AMF 135 may query NSSF 136 for one or more network slices in response to a request from an endpoint device (such as UE 104 or UE 106) to establish a session to communicate with a PDN. The NSSF 136 may provide the selection to AMF 135, or may provide one or more permitted network slices to AMF 135, where AMF 135 may select the network slice from among the choices. A network slice may comprise a set of cellular network components, e.g., network functions (NFs), such as AMF(s), SMF(s), UPF(s), and so forth that may be arranged into different network slices which may logically be considered to be separate cellular networks. A specific set of NFs arranged into a network slice may also be referred to as a network slice instance (NSI). In one example, different network slices may be preferentially utilized for different types of services. For instance, a first network slice may be utilized for sensor data communications, Internet of Things (IoT), and machine-type communication (MTC), a second network slice may be used for streaming video services, a third network slice may be utilized for voice calling, a fourth network slice may be used for gaming services, a fifth network slice may be used for first responder or other governmental services, and so forth.

In one example, SMF 137 may perform endpoint device IP address management, UPF selection, UPF configuration for endpoint device traffic routing to an external packet data network (PDN), charging data collection, quality of service (QoS) enforcement, and so forth. In one example, UDM 138 may perform user identification, credential processing, access authorization, registration management, mobility management, subscription management, and so forth. As illustrated in FIG. 1, UDM 138 may be tightly coupled to HSS 133. For instance, UDM 138 and HSS 133 may be co-located on a single host device, or may share a same processing system comprising one or more host devices. In one example, UDM 138 and HSS 133 may comprise interfaces for accessing the same or substantially similar information stored in a database on a same shared device or one or more different devices, such as subscription information, endpoint device capability information, endpoint device location information, and so forth. For instance, in one example, UDM 138 and HSS 133 may both access subscription information or the like that is stored in a unified data repository (UDR) (not shown).

UPF 139 may provide an interconnection point to one or more external packet data networks (PDN(s)) and perform packet routing and forwarding, QoS enforcement, traffic shaping, packet inspection, and so forth. In one example, UPF 139 may also comprise a mobility anchor point for 4G-to-5G and 5G-to-4G session transfers. In this regard, it should be noted that UPF 139 and PGW 134 may provide the same or substantially similar functions, and in one example, may comprise the same device, or may share a same processing system comprising one or more host devices.

As noted above, cellular core network 130 further includes NWDAF 192, which may be tasked monitoring various network functions, network slices, and access network components. In one example, NWDAF 192 may subscribe to data analytics (e.g., performance indicators/ KPIs) from a variety of NFs, may store these analytics, and may provide such analytics to other NFs that may request such data. For instance, NSSF 136 may obtain slice load level analytics which may be used by NSSF 136 to select a network slice or network slices to serve an endpoint device, or may indicate one or more network slices that are permitted to be selected to serve an endpoint device. For instance, AMF 135 may query NSSF 136 for one or more network slices in response to a request from an endpoint device to establish a session to communicate with a PDN (e.g., which may be represented by other network(s) 180 in FIG. 1). The NSSF 136 may provide the selection to AMF 135, or may provide one or more permitted network slices to AMF 135, where AMF 135 may select the network slice from among the choices. In one example, AMF 135 may utilize additional information such as a UE/subscriber class or category from HSS 133. For example, when a slice is indicated to have a particular load level above a threshold, UEs/subscribers of one or more defined classes/categories may be prevented from accessing the slice, or may have preferential access to the slice over other classes/categories, and so forth. In accordance with the present disclosure, in one example NWDAF 192 may track various performance indicators with respect to access network 120 and/or regarding particular components thereof (such as RUs, DUs, CU, etc., e.g., cell sites 121 and 122, BBU pool 125, cell sites 123 and 124, and so forth).

It should be noted that other examples may comprise a cellular network with a "non-stand alone" (NSA) mode architecture where 5G radio access network components, such as a "new radio" (NR), "gNodeB" (or "gNB"), and so forth are supported by a 4G/LTE core network (e.g., an EPC network), or a 5G "standalone" (SA) mode point-to-point or service-based architecture where components and functions of an EPC network are replaced by a 5G core network (e.g., an "NC"). For instance, in non-standalone (NSA) mode architecture, LTE radio equipment may continue to be used for cell signaling and management communications, while user data may rely upon a 5G new radio (NR), including millimeter wave communications, for example. However, examples of the present disclosure relate to a hybrid, or integrated 4G/LTE-5G cellular core network such as cellular core network 130 illustrated in FIG. 1. In this regard, FIG. 1 illustrates a connection between AMF 135 and MME 131, e.g., an "N26" interface which may convey signaling between AMF 135 and MME 131 relating to endpoint device tracking as endpoint devices are served via 4G or 5G components, respectively, signaling relating to handovers between 4G and 5G components, and so forth.

In one example, service network 140 may comprise one or more devices for providing services to subscribers, customers, and or users. For example, communication service provider network 101 may provide a cloud storage service, web server hosting, and other services. As such, service network 140 may represent aspects of communication service provider network 101 where infrastructure for supporting such services may be deployed. In one example, other networks 180 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 180 may include different types of networks. In another example, the other networks 180 may be the same type of network. In one example, the other networks 180 may represent the Internet in general. In this regard, it should be noted that any one or more of service network 140, other networks 180, or IMS network 150 may comprise a packet data network (PDN) to which an endpoint device may establish a connection via cellular core network 130 in accordance with the present disclosure.

FIG. 1 also illustrates various endpoint devices, e.g., user equipment (UE) 104 and 106. UE 104 and 106 may each comprise a cellular telephone, a smartphone, a tablet computing device, a laptop computer, a pair of computing glasses, a wireless enabled wristwatch, a wireless transceiver for a fixed wireless broadband (FWB) deployment, or any other cellular-capable mobile telephony and computing device (broadly, "an endpoint device"). In one example, each of UE 104 and UE 106 may each be equipped with one or more directional antennas, or antenna arrays (e.g., having a half-power azimuthal beamwidth of 120 degrees or less, 90 degrees or less, 60 degrees or less, etc.), e.g., MIMO antenna(s) to receive multi-path and/or spatial diversity signals. Each of UE 104 and UE 106 may also include a gyroscope and compass to determine orientation(s), a global positioning system (GPS) receiver for determining a location, and so forth. As illustrated in FIG. 1, UE 104 may access wireless services via the cell site 121, while UE 106 may access wireless services via any of cell sites 122-124 located in the access network 120.

In one example, any one or more of the components of cellular core network 130 may comprise network function virtualization infrastructure (NFVI), e.g., SDN host devices (i.e., physical devices) configured to operate as various virtual network functions (VNFs), such as a virtual MME (vMME), a virtual HHS (vHSS), a virtual serving gateway (vSGW), a virtual packet data network gateway (vPGW), and so forth. For instance, MME 131 may comprise a vMME, SGW 132 may comprise a vSGW, and so forth. Similarly, AMF 135, NSSF 136, SMF 137, UDM 138, NWDAF 192, and/or UPF 139 may also comprise NFVI configured to operate as VNFs. In addition, when comprised of various NFVI, the cellular core network 130 may be expanded (or contracted) to include more or less components than the state of cellular core network 130 that is illustrated in FIG. 1.

In this regard, the cellular network 110 may also include a service and management orchestrator (SMO) 190. For instance, in one example, SMO 190 may comprise a self-optimizing network (SON) orchestrator and/or software defined network (SDN) controller. To illustrate, SMO 190 may function as a self-optimizing network (SON) orchestrator that is responsible for activating and deactivating, allocating and deallocating, and otherwise managing a variety of network components. For instance, SMO 190 may activate and deactivate antennas/remote radio heads of cell sites 121 and 122, respectively, may allocate and deactivate baseband units in BBU pool 126, and may perform other operations for activating antennas based upon a location and a movement of an endpoint device or a group of endpoint devices, in accordance with the present disclosure.

In one example, SMO 190 may further comprise a SDN controller that is responsible for instantiating, configuring, managing, and releasing VNFs. For example, in a SDN architecture, a SDN controller may instantiate VNFs on shared hardware, e.g., NFVI/host devices/SDN nodes, which may be physically located in various places. In one example, the configuring, releasing, and reconfiguring of SDN nodes is controlled by the SDN controller, which may store configuration codes, e.g., computer/processor-executable programs, instructions, or the like for various functions which can be loaded onto an SDN node. In another example, the SDN controller may instruct, or request an SDN node to retrieve appropriate configuration codes from a network-based repository, e.g., a storage device, to relieve the SDN controller from having to store and transfer configuration codes for various functions to the SDN nodes.

Accordingly, the SMO 190 may be connected directly or indirectly to any one or more network elements of cellular core network 130, access network 120, and of the system 100 in general. Due to the relatively large number of connections available between SMO 190 and other network elements, none of the actual links to the SON/SDN controller 190 are shown in FIG. 1. Similarly, intermediate devices and links between MME 131, SGW 132, cell sites 121-124, PGW 134, AMF 135, NSSF 136, SMF 137, UDM 138, NWDAF 192, and/or UPF 139, and other components of system 100 are also omitted for clarity, such as additional routers, switches, gateways, and the like.

In one example, SMO 190 may include a RAN intelligent controller (RAN-IC or RIC) 199. For instance, in an O-RAN architecture, the RIC 199 may be deployed for managing and controlling various RAN components/functions, e.g., CUs, DUs, and RUs. For instance, as noted above, RIC 199 may comprise a platform that hosts various RAN applications (e.g., xApps/rApps) that may be used to configure and reconfigure various components of access network 120. In one example, aspects of RIC 199 may represent functionality of an SON orchestrator, or vice versa. In accordance with the present disclosure, RIC 199 may include an RL-based agent, e.g., comprising an RL-based algorithm, or model, for processing execution requests for different RAN applications (e.g., sets of execution requests that may be received in a designated time window).

In one example, RIC 199 and/or SMO 190 may request and/or subscribe to various information that may be obtained and stored by NWDAF 192. Such information may include time-stamped RAN performance indicators (e.g., KPIs for various time blocks/intervals), RAN environment state information (e.g., RAN parameters and/or settings associated with the time blocks/intervals for which performance indicators may be measured/collected), or the like. Alternatively, or in addition RIC 199 and/or SMO 190 may obtain various information from RAN components or other network elements directly (e.g., without NWDAF 192 as an intermediary). In one example, SMO 190 may comprise a computing platform/system hosting various RAN applications, which may comprise programs, code, etc. running on computing hardware of the SMO 190. As noted above, in one example, the RAN applications may include xApps and rApps. However, examples of the present disclosure may include modifications of execution sets, including delay and re-ordering of requested executions. As such, in one example, the present disclosure may primarily be focused on rApp-type RAN applications, e.g., those that do not demand immediate execution.

In one example, RIC 199 may include an RL-based agent, e.g., comprising an RL-based algorithm/model that may be configured with an initial policy, e.g., performing executions requested by RAN application in the order received and/or according to timings as indicated in the requests, and that may learn a new policy over time via a reinforcement learning process that may apply modifications to execution sets in accordance with execution requests from various RAN applications of the SMO 190. For instance, it may be assumed that the interactions among RAN application requests will at least provide a minimum acceptable level of network performance and will not cause unacceptable errors in access network 120 (such as complete loss of network access for a subset of UEs, etc.). For example, before live activation on SMO 190, RAN applications may undergo rigorous testing to ensure that the RAN applications do not negatively impact the network and do not have unacceptable conflicts with other RAN applications (e.g., flagrant conflicts that may be detected by RAN application developers, network operators, or the like during a testing process). As such, default ordering of executions per RAN application execution requests may provide a measurable level of performance, although it may be less than optimal, or less than achievable through reinforcement learning.

For example, NWDAF 192 and/or RIC 199 (or other components of SMO 190) may collect time-stamped RAN performance indicators and RAN environment state information, or the like. From this data, an RL-based agent of RIC 199 may then identify performance indicators having conflicts with each other. For instance, a traffic steering rApp may seek to maximize average UE throughput by offloading from an overloaded serving cell to one or more neighboring underloaded cells. On the other hand, an energy-saving rApp, may seek to reduce energy consumption by placing underloaded cells into sleep mode, which places these performance indicators in conflict. For example, observing time series of these performance indicators, a negative correlation value may be apparent.

To further illustrate, an RL-based agent of RIC 199 may implement an RL-based algorithm that tracks RAN application execution requests (and/or execution performance) to learn default behaviors for execution sets (e.g., no modifications) and corresponding reward values. In addition, the RL-based agent may explore modifications of execution sets and collect performance data. In one example, the RL-based agent may be configured to implement a heuristic approach that incrementally increases the degree of change of action, e.g., from conservative modifications (such as short delays of request executions) to more aggressive modifications (e.g., longer delay, omitting executions completely, omitting executions for multiple RAN applications, etc.). Similarly, for the selection of the length of a time window, the RL-based agent may start conservatively, e.g., one-second to much longer, e.g., 10 minutes, 20 minutes, or the like. However, in one example, the RL-based exploration of modifications may be constrained by guidelines, e.g., defined by an operator of cellular network 110/communication service provider network 101. In one example, the RL-based agent may consider modifications for execution sets in which there is a conflict, e.g., between performance indicators that are negatively correlated with each other, between requested executions targeting the same performance indicator, or between requested executions that seek to tune/adjust the same configurable RAN setting.

In a third phase, the RL-based agent may be observed to converge to an optimal policy. In this phase, RL-based exploration may be ramped down. However, in one example, RL-based exploration may not cease entirely. For instance, to avoid confirmation bias and to not miss opportunities to further the reward value, additional RL-based exploration may be initiated from time to time, e.g., periodically or otherwise. In one example, the RL-based agent may implement a Q-table-based RL-based algorithm. For instance, in such an example, once the Q-table converges to an optimal policy (e.g., even with new trials, it does not improve the reward values), the frequency of trials may be reduced. In one example, in a later phase, the RL-based agent may also be extended to build a more resource-intense RL model (e.g., a deep Q neural network model, or the like), e.g., from all or a portion of the previously collected data and/or new data from additional explorations. In one example, a neural network-based model may also fill gaps in the Q-table through interpolation (e.g., in case that Q-table is not dense enough or is coarse-grained by the discretization).

Figure 5:
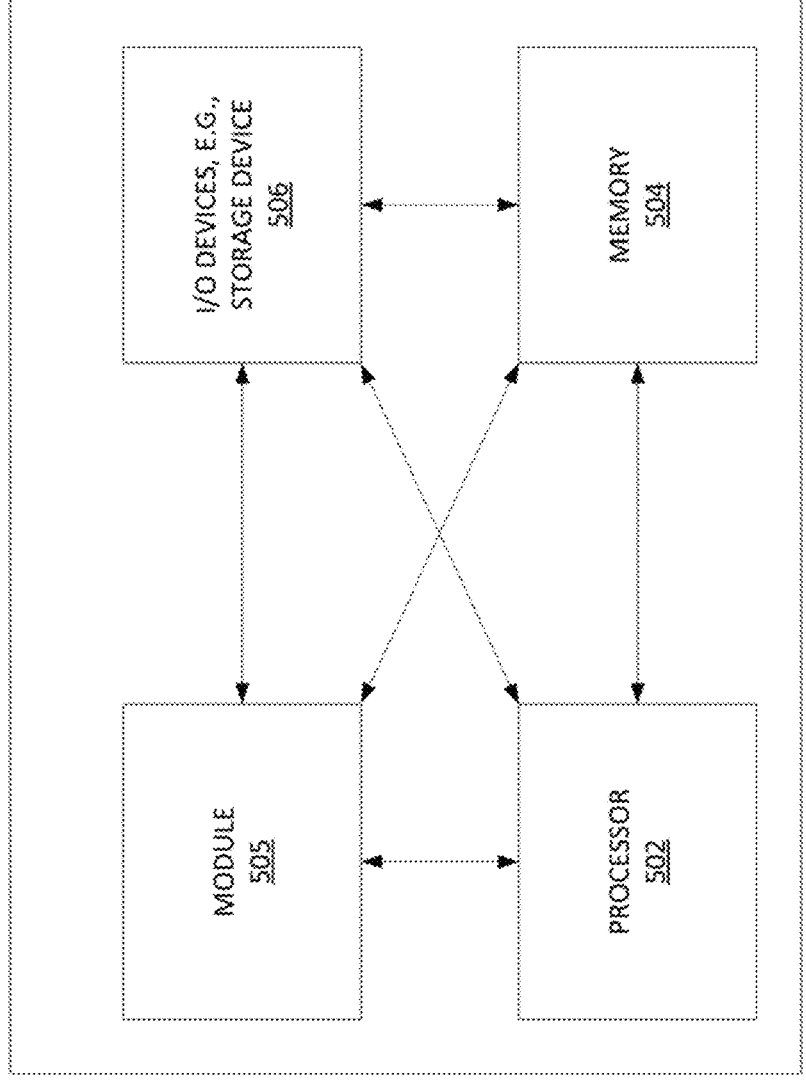
FIG. 5 illustrates an example of a computing device, or computing system, specifically programmed to perform the steps, functions, blocks, and/or operations described herein.

In one example, aspects of the present disclosure for implementing at least one modification to a set of execution requests from a plurality of radio access network functions in accordance with a reinforcement learning-based algorithm in response to identifying at least one conflict within the set of execution requests, e.g., as described in greater detail below in connection with the example method 400 of FIG. 4, may be performed by RIC 199 and/or SMO 190. In this regard, in one example, RIC 199 and/or SMO 190 may comprise all or a portion of a computing device or system, such as computing system 500, and/or processing system 502 as described in connection with FIG. 5 below, and may be configured to perform various operations in connection with examples of the present disclosure for implementing at least one modification to a set of execution requests from a plurality of radio access network functions in accordance with a reinforcement learning-based algorithm in response to identifying at least one conflict within the set of execution requests. In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 5 and discussed below) or multiple computing devices collectively configured to perform various steps, functions, and/or operations in accordance with the present disclosure.

The foregoing description of the system 100 is provided as an illustrative example only. In other words, the example of system 100 is merely illustrative of one network configuration that is suitable for implementing embodiments of the present disclosure. As such, other logical and/or physical arrangements for the system 100 may be implemented in accordance with the present disclosure. For example, the system 100 may be expanded to include additional networks, such as network operations center (NOC) networks, additional access networks, and so forth. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

For instance, in one example, the cellular core network 130 may further include a Diameter routing agent (DRA) which may be engaged in the proper routing of messages between other elements within cellular core network 130, and with other components of the system 100, such as a call session control function (CSCF) (not shown) in IMS network 150. In another example, the NSSF 136 may be integrated within the AMF 135. In addition, cellular core network 130 may also include additional 5G NG core components, such as: a policy control function (PCF), an authentication server function (AUSF), a network repository function (NRF), and other application functions (AFs).

In one example, any one or more of cell sites 121-123 may comprise 2G, 3G, 4G and/or LTE radios, e.g., in addition to 5G new radio (NR), or gNB functionality. For instance, cell site 123 is illustrated as being in communication with AMF 135 in addition to MME 131 and SGW 132. It should be noted that the example described above involves a 4G-to-5G PDN connection transfer (and 5G-to-4G reversion) that includes UE 106 transferring from cell site 124 to cell site 122 (and vice versa). However, in another example, UE 106 may establish a 4G session to a PDN via 4G/LTE components of cell site 123, and may be transferred to a 5G connection via 5G components of the same cell site 123 in response to one or more trigger conditions as described above.

In addition, network elements or functions that are illustrating as being deployed in one portion of the communication service provider network 101 may alternatively or additionally be deployed in another portion of the communication service provider network 101. For example, SMO 190 may be deployed in cellular core network 130, within access network 120, or may comprise a distributed computing platform having hardware components within cellular core network 130 and access network 120. As discussed above, in one example, at least a portion of the RL-based exploration may include a network simulation. Thus, for instance, network simulation of different execution sets and modifications thereof may be performed via one or more computing devices, e.g., one or more servers, dedicated to this task, such as components of service network 140 and/or components of other network(s) 180 (e.g., a network simulation system hosted on public cloud infrastructure, or the like). However, in another example, the simulation may be provided by SMO 190 and/or RIC 199. Thus, these and other modifications are all contemplated within the scope of the present disclosure.

To further aid in understanding the present disclosure, FIG. 2 illustrates an example correlation table 210 for an example radio access network, or portion thereof. In the correlation table 210, +1 indicates a strongest possible positive correlation, while −1 indicates a strongest possible negative correlation and zero (0) indicates no correlation (e.g., independence). For instance, the correlation table 210 may include pairwise correlation values for downlink (DL) throughput, uplink (UL) throughput, energy utilization, coverage, and spectral efficiency. In one example, each data point may be computed as a cross-correlation function, a cosine similarity, a Pearson correlation coefficient, etc. It is again noted that RAN applications may aim to achieve optimal performance indicator values by adjusting RAN configuration parameters. For example, an energy consumption application may be designed to minimize energy consumption while another application may be designed to maximize the downlink throughput. These applications may attempt to achieve their respective goals by adjusting overlapping RAN parameters. As shown in the correlation table 210, the correlation between energy consumption and the downlink throughput is close to −1, indicating a strong negative potential conflict. However, as also noted above, these types of conflicts may be dynamic over time. For instance, some conflicts may be found at certain times and/or on certain days, at certain locations, etc.

In this regard, FIG. 2 further illustrates an example graph 220 indicating dependencies and conflicts over time (e.g., a 24 hour period) for several performance indicators in an example radio access network, or portion thereof. For instance, the graph 210 illustrates pairwise correlations among downlink (DL) throughput, uplink (UL) throughput, energy utilization, and coverage over 24 hours. In the graph 220, +1 indicates a strongest possible positive correlation, while −1 indicates a strongest possible negative correlation and zero (0) indicates no correlation (e.g., independence). To further illustrate, the energy consumption and the downlink throughput performance indicators conflict with the high chance (e.g., the overall average correlation is −0.8 in table 210). However, the negative correlation values between these performance indicators are predominantly observed during busy hours (e.g., between 8 AM and 8 PM, as shown in the graph 220). Thus, it is possible to configure a policy that is not concerned with potential conflicts between these performance indicators throughout the rest of the day (e.g., between 8 PM and 8 AM). Accordingly, an optimized policy may account for such information instead of blindly controlling the conflict just by relying on the average value. Additional considerations of application reconfiguration, traffic seasonality, software and hardware upgrade, and other RAN environment changes may also be accounted for via RL-based policy learning (e.g., in contrast to non-scalable static/manual policies).

To further illustrate, three RAN applications may be considered which have potential conflicts with each other. The first RAN application may comprise a traffic steering application (TRO), to maximize average UE throughput by off-loading from an overloaded serving cell to one or more neighboring underloaded cells. The second RAN application may comprise an energy-saving application (ES), which saves energy consumption by placing underloaded cells into sleep mode. Finally, an automatic neighbor relations (ANR) application may be for dynamically adjusting the neighbor relations of cells to serve UEs with better signal conditions. As illustrated in FIG. 2, energy consumption and throughput (both uplink and downlink) conflict.

In one example, when a TRO application finds an overloaded serving cell, it may attempt to hand over some connected UEs to underloaded neighbor cells. Meanwhile, an energy saving (ES) application may also find one of these neighbor cells and attempt to place it into sleep mode. If TRO execution is triggered just after ES execution (e.g., within a short time window), UE handovers may fail. In the reverse order (e.g., TRO first and then ES), the decision made by ES may be incorrect (or ignored) because the neighbor cell may not be underloaded anymore. Moreover, if the gain from the energy saving is higher than the gain from throughput improvement, these actions may not be optimal. As another example of conflict, a TRO application may find the neighboring cells of a serving cell to trigger UE handovers, while an ANR application may remove some of the neighboring cells from the neighbor list of the serving cell. Suppose the ANR execution is triggered just after TRO execution, and the ANR application removes a neighbor cell from the neighbor list of the serving cell. In that case, some of the UE handovers may fail (or may be ignored) because the target neighbor cell is no longer the neighbor of the serving cell.

As shown in FIG. 2, some performance indicator pairs have negative correlation values. For instance, downlink throughput and energy savings are in conflict (strong negative correlations). It is also observed that a TRO application may attempt to achieve an optimal downlink throughput, while an ES application may attempt to achieve an optimal energy consumption (e.g., minimal energy consumption). These two performance indicators have a strong negative correlation, as shown in table 210. Furthermore, such conflicts may predominantly occur during busy hours, e.g., as shown in graph 220. To further illustrate, another RAN application (AO) may aim to dynamically balance the loads among neighboring cells to maximize the uplink and downlink UE throughput and the spectrum efficiency performance indicators. AO and TRO may therefore have a common target performance indicator, the downlink UE throughput. Suppose both of these RAN applications attempt to execute within a short time window, and that their decisions regarding the target neighbor cells for UE handovers can be different. In such case, the present disclosure may identify such a conflict and determine which one to execute (e.g., when a request is executed, this means that a requested change to a configurable setting is implemented/performed).

Another type of conflict is a parameter conflicts. In the above example, the target performance indicators of an AO application goal function may not be exactly the same as those of the TRO application goal function. However, the respective applications may tune/adjust one or more of the same RAN parameters in attempts to achieve the respective goals, such as idle mode, connected load balancing, and signal coverage-related parameters. Similar to performance indicator conflicts, if both RAN applications attempt to adjust the same parameter(s) within a short time window and their decisions for the adjustments are different, the present disclosure may identify such conflicts and may ignore one or both of their executions.

Figure 3:
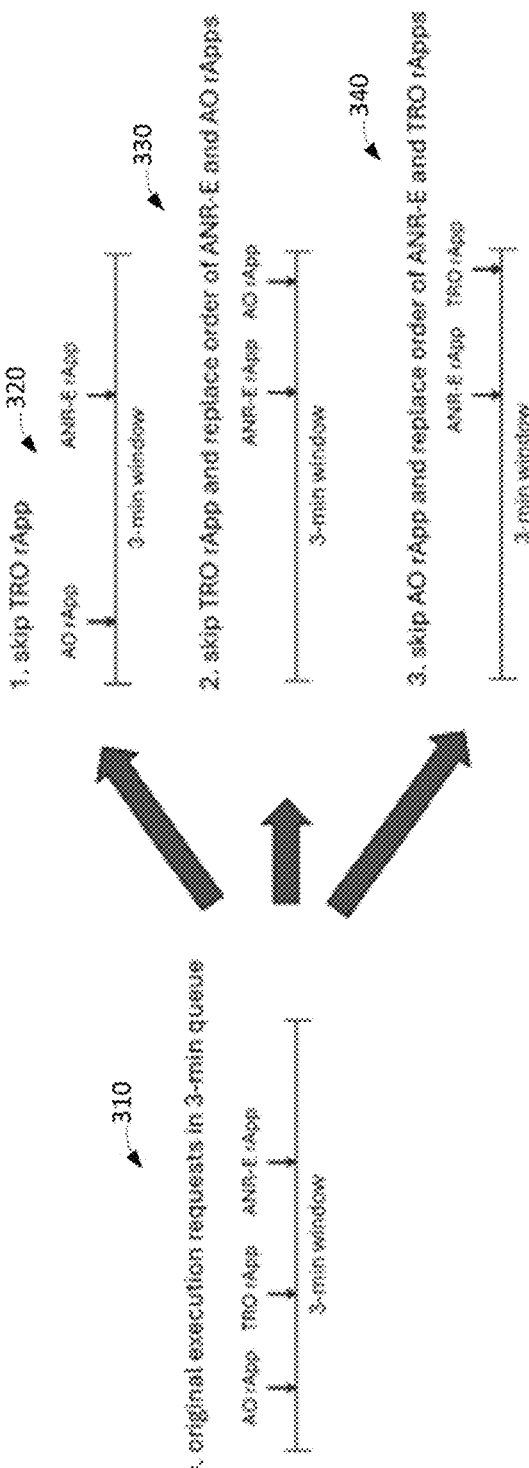
FIG. 3 illustrates an example execution set for executions requested by radio access network applications within a designated time window and examples of corresponding modifications to the execution set that may be applied.

To further aid in understanding the present disclosure FIG. 3 illustrates an example execution set 310 within a designated time window and examples of corresponding modifications to the execution set (e.g., modified execution sets 320, 330, 340) that may be applied. The example of FIG. 3 relates to three RAN applications having potential conflicts with each other. The first RAN application is a traffic steering application (TRO), to maximize average UE throughput by off-loading from an overloaded serving cell to one or more neighboring underloaded cells. The second is an energy-saving application (ES), which saves energy consumption by placing underloaded cells into sleep mode. Finally, an automatic neighbor relations (ANR) application may be for dynamically adjusting the neighbor relations of cells to serve UEs with better signal conditions.

In one example, the intent of each RAN application may be directly or indirectly defined with one or more performance indicators in its goal function. For example, the intent of an AO application may be to maximize the uplink throughput, downlink throughput, and spectrum efficiency performance indicators as described in its goal function. An ANR application may not have any specific performance indicator in its intent/goal function. However, it may indirectly impact some performance indicators such as uplink throughput, downlink throughput, cell coverage, and spectrum efficiency because its controlling behaviors change the overall signal quality for UEs. Nevertheless, most RAN applications may attempt to adjust RAN configuration parameters to achieve their goals defined with performance indicators. Thus, the adjustments of RAN parameters triggered by RNA applications directly impact those performance indicators. With these relations among intents, RAN parameters, and performance indicators, the conflict measurement can be realized with a reinforcement learning (RL) reward (or penalty) function that may comprise those target performance indicators and the corresponding weight values of the performance indicators. The reward (or penalty) value can numerically indicate the extent to which executions requested by RAN applications avoid (or generate) conflicts.

For instance, RL-based agent may be trained to find an optimal policy to maximize the reward. The optimal policy guides the RL-based agent in selecting the optimal action among a set of possible actions for a given input state. In examples of the present disclosure, the input state can include time variables (e.g., the time of day, day of the week, the month of the year), cell load conditions (e.g., physical resource block (PRB) utilization, transaction volume, the number of concurrent active UE connections, the number of UE handovers), signal conditions (e.g., channel quality information (CQI), reference signal received power (RSRP), reference signal received quality (RSRQ), signal to interference and noise ratio (SINR), physical downlink control channel (PDCCH) information, physical uplink control channel (PUCCH) information, and other input variables for various RAN applications. Selecting an action driven by the optimal policy may depend on which RAN applications, among a set of requested executions within a time window (e.g., one minute, two minutes, three minutes, five minutes, etc.) are chosen to execute, and how the selected ones can be executed. For instance, one or more executions for given RAN applications can be intentionally skipped or postponed, and/or the order of executions can be reordered for a set of execution requests in the time window. Similarly, an RL-based agent may explore adjustments to the length of a time window within which to consider a set of RAN application executions that are requested. For example, RAN application execution requests may be collected in a 1-minute queue, 2-minute queue, 3-minute queue, 5-minute queue, etc.

In this regard, FIG. 3 illustrates an example execution set 310 within a 3-minute time window in which an AO application, TRO application, and ANR application have requested executions (e.g., from a RAN intelligent controller (RIC) of an SMO platform), in that particular order. A first possible modification to this execution set is to skip a requested execution for the TRO application (e.g., modified execution set 320). A second possible modification is to skip a requested execution for the TRO application and reorder the executions for the ANR and AO applications (e.g., modified execution set 330). A third possible modification is to skip a requested execution for the AO application and reorder the executions for the ANR and TRO applications (e.g., modified execution set 340). It should be noted that FIG. 3 illustrates just several example modifications, and that other, further, and different modifications of the same or similar nature may be devised in other examples.

In accordance with the present disclosure, an RL-based agent (e.g., a program or set of programs operating as part of a RAN intelligent controller of a RAN SMO platform) may explore these types of modifications as its actions, and may learn which modifications may lead to overall improvements in RAN performance. Using a trained RL-based agent, the present disclosure may then process sets of RAN application execution requests (such as execution set 310) and may select to skip or postpone certain executions (or to leave the execution set 310, as-is, e.g., as received)/requested). In particular, an RL-based agent may measure the reward value resulting from each action and record the value. Once it collects enough samples (e.g., the RAN state, corresponding chosen action, and reward value), the RL-based agent can see which action is better for a given state than others. Thus, a policy may be built/trained into the RL-based agent using the collected data. However, it should be noted that in some examples, a default ordering of execution requests (e.g., in the order received, or in accordance with the execution times as requested by the respective RAN applications) may still be found to be an optimal course of action. In other words, the RL-based agent may learn that no modification as a default action leads to an optimal overall RAN performance.

FIG. 4 illustrates a flowchart of an example method 400 for implementing at least one modification to a set of execution requests from a plurality of radio access network functions in accordance with a reinforcement learning-based algorithm in response to identifying at least one conflict within the set of execution requests, in accordance with the present disclosure. In one example, steps, functions and/or operations of the method 400 may be performed by a device as illustrated in FIG. 1, e.g., SMO 190 and/or RIC 199, or any one or more components thereof, such as a processing system, or collectively via a plurality devices in FIG. 1, such as SMO 190 in conjunction with NWDAF 192, cell sites 121 and 122, BBU pool 126, and so forth. In one example, the steps, functions, or operations of method 400 may be performed by a computing device or system 500, and/or a processing system 502 as described in connection with FIG. 5 below. For instance, the computing device 500 may represent at least a portion of SMO 190 and/or RIC 199 in accordance with the present disclosure. For illustrative purposes, the method 400 is described in greater detail below in connection with an example performed by a processing system, such as processing system 502. The method 400 begins in step 405 and may proceed to optional step 410 or step 420.

At optional step 410, the processing system may obtain a plurality of time series comprising metrics for a plurality of network performance indicators for a radio access network. For instance, the network performance indicators may be for at least a portion or a radio access network, such as a base station/cell site, a tracking area (e.g., a set/cluster of base stations/cell sites defined by a tracking area code (TAC) or the like), etc. In one example, the network performance indicators may include an uplink throughput, a downlink throughput, an energy consumption, a coverage measure, a spectral efficiency, and so forth. In one example, the metrics may be time-stamped for inclusion in the respective time series. In one example, optional step 410 may further include obtaining network state information associated with the network performance indicators, e.g., time-stamped network state information, which may be associated with respective time index (e.g., instances or intervals of time), and therefore which may be associated with various metrics of respective network performance indicator time series for the same time index. In one example, the metrics for the plurality of network performance indicators may be obtained from respective RAN components (e.g., from one or more CUs, DUs, and/or RUs (or RRHs and/or BBUs), etc.) and/or from one or more cellular core network components (e.g., from an AMF or SMF, from an NWDAF, etc.).

At optional step 420, the processing system may identify pairwise correlation values among the plurality of network performance indicators based upon portions of the plurality of time series associated with a correlation time period. For instance, the processing system may compute correlation such as illustrated in and described in connection with the example correlation table 210 of FIG. 2. In addition, in one example, optional step 420 may include identifying pairwise correlation values over an extended period of time, such as illustrated and described in connection with the example graph 220 of FIG. 2.

At step 430, the processing system receives a set of execution requests from a plurality of RAN applications within a defined period of time, wherein each execution request of the set of execution requests is to perform at least one execution for configuring at least one aspect of a radio access network. For instance, in one example, the processing system may comprise a RAN intelligent controller (RAN-IC or RIC), where the plurality of RAN applications includes at least one of: an open radio access network (O-RAN) real-time application or an O-RAN non-real-time application. In this regard, the performing of the at least one execution for configuring at least one aspect of a radio access network may comprise implementing/performing a requested change to a configurable setting, e.g., a configurable RAN setting.

At step 440, the processing system identifies at least one conflict among at least two of the plurality of RAN applications. For instance, in one example, the conflict may comprise two or more RAN applications targeting conflicting performance indicators (negative correlated performance indicators), two or more RAN applications targeting the same performance indicator, or two or more RAN applications seeking to adjust the same setting(s) (regardless of which performance indicators may be targeted by the respective RAN applications). For example, the identifying of the at least one conflict may comprise identifying that the at least two of the plurality of RAN applications have respective goal functions that target respective network performance indicators having a negative pairwise correlation value with each other (e.g., an uplink throughput versus energy consumption, downlink throughput versus energy consumption, etc.). To further illustrate, the respective network performance indicators may comprise at least two of: an uplink throughput, a downlink throughput, an energy consumption, a coverage measure, a spectral efficiency, or the like. In another example, the identifying of the at least one conflict may comprise identifying that the at least two of the RAN applications have respective goal functions that target a same network performance indicator. In still another example, the identifying of the at least one conflict may comprise identifying that at least two execution requests in the set of execution requests are for configuring a same aspect of a radio access network, e.g., they are for adjusting a same configurable RAN setting.

At step 450, the processing system selects, e.g., as an action in response to identifying the at least one conflict, at least one modification to the set of execution requests in accordance with a reinforcement learning (RL)-based algorithm. For instance, in one example, the RL-based algorithm may comprise a q-table algorithm. In one example, the RL-based algorithm may comprise a deep neural network (DNN) (e.g., a neural network with multiple layers), such as a convolutional neural network (CNN), a recurrent neural network (RNN), etc. In one example, the RL-based algorithm may comprise a deep-Q algorithm. In one example, the RL-based algorithm may be trained (e.g., the policy may be incrementally updated/improved) according to a defined reward function. For example, there may be weightings indicating the relative importance of different performance indicators to each other. Thus, when maximizing for overall reward/value, tuning for one performance indicator may be more favored than for another. In one example, the RL-based algorithm may include an exploration of modifications to sets of action requests as candidate actions to identify changes in outcomes based upon the defined reward function.

As discussed above, the at least one modification as an action may comprise changing an order of executions associated with at least two of the execution requests of the set of execution requests. In one example, the at least one modification may alternatively or additionally comprise omitting an execution associated with at least one execution request of the set of execution requests. Alternatively, or in addition, the at least one modification may comprise delaying an execution associated with at least one execution request of the set of execution requests (e.g., with respect to an expected time of execution, such as according to a first in-first out (FIFO) ordering of executions based on the execution requests). It should be noted that in one example, some or all of the execution requests may have at least one execution parameter. For instance, the at least one execution parameter may define a maximum permitted delay between the execution request and the execution indicated/requested in the execution request. In one example, the at least one modification may be selected when it is determined via the RL-based algorithm that the at least one modification provides an improved outcome in accordance with the defined reward function as compared to a non-modification of the set of execution requests.

In one example, the exploration of modifications may be in accordance with at least one constraint, which may define at least one of: a maximum or minimum value for at least one network performance indicator, a maximum or minimum value for at least one configurable setting of the radio access network, or the like. For instance, in one example, the network operator may give guardrails for performance indicators, e.g., energy efficiency minimum, per-user throughput minimum, per user throughput maximum, and/or guardrails for certain parameters, e.g., transmit power cannot exceed 70% of maximum capability of DU, etc. Then the RL-based algorithm may explore within the guardrails and may incorporate linear (or other) combination(s) of individual performance indicator goals for the set of RAN applications associated with the executions requests to maximize the overall value, or reward. In one example, the at least one constraint may be a maximum delay for an execution associated with an execution request of the set of execution requests, e.g., the RL-based algorithm may be allowed to delay an execution (which could result in reordering with respect to one or more other executions associated with other execution requests in the set) but only up to a maximum delay, e.g., measured from when the execution request is submitted. In one example, the RL-based algorithm may further include an exploration of modifications to the defined period of time (e.g., changing the duration to be shorter or longer). In one example, the exploration of modifications may be via a simulation of the radio access network. In one example, such a simulation may be hosted on and run via the processing system.

At step 460, the processing system performs at least a first execution associated with the set of execution requests according to the at least one modification to configure at least a first aspect of the radio access network. For instance, the processing system may transmit one or more instructions to one or more components of the RAN, such as a CU, a DU, an RU (or an RRH, BBU, or the like). The instruction(s) may be to change one or more configurable settings of one or more of such components (which may be considered to be configurable settings of the RAN in which the components are deployed). For instance, the configurable settings can include selection of transmit power, antenna array tilt, beamwidth, etc., selection of precoding techniques, changes to thresholds for UE offloading and/or handover to neighboring cells, activation and deactivation of DUs and RUs, activation and deactivation of CUs, assignment of DUs to one or more CUs, allocation of physical resource, bandwidth, etc. to one or more network slices, and so forth. In one example, step 460 may further include transmitting one or more instructions to one or more other network components, such as an AMF, an NSSF, etc. For instance, reconfigurations of these components may be made in support of a change to at least one aspect of the RAN, such as offloading of UEs to a new network slice that may utilize certain cell sites and not others, and so forth. In this regard, it is again noted that the performing of the at least the first execution may comprise implementing/performing one or more requested changes to one or more configurable settings, e.g., configurable RAN setting(s) as discussed above.

Following step 460, the method 400 may proceed to step 495 where the method ends.

It should be noted that the method 400 may be expanded to include additional steps or may be modified to include additional operations with respect to the steps outlined above. In one example, various steps of the method 400 may be repeated for the same or different network function, for the same or different network slice, and so forth. For instance, the processing system may repeat steps 430-460 for additional sets of execution requests, and so forth. In one example, the method 400 may be expanded to further include training of the RL-based algorithm via observation and trials of different modifications and/or via simulation of the RAN or at least a portion thereof (such as a tracking area) and/or a simulation of a cellular network including the RAN. For instance, the processing system may generate potential execution sets and may then simulate performance of the execution sets according to a default policy, select possible modifications to the execution sets and simulate performance of the execution sets in accordance with the selected modifications, collect network performance indicator measurements, etc. In one example, the method 400 may further include training a deep neural network, such as a deep-Q network, based upon the data collected. In one example, the method 400 may be expanded or modified to include steps, functions, and/or operations, or other features described above in connection with the example(s) of FIGS. 1-3, or as described elsewhere herein. Thus, these and other modifications are all contemplated within the scope of the present disclosure.

In addition, although not specifically specified, one or more steps, functions, or operations of the example, method 400 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 4 that recite a determining operation or involve a decision do not necessarily require that both branches of the determining operation be practiced. In other words, one of the branches of the determining operation can be deemed as an optional step. Furthermore, steps, blocks, functions or operations of the above described method(s) can be combined, separated, and/or performed in a different order from that described above, without departing from the examples of the present disclosure.

FIG. 5 depicts a high-level block diagram of a computing device or processing system specifically programmed to perform the functions described herein. As depicted in FIG. 5, the processing system 500 comprises one or more hardware processor elements 502 (e.g., a central processing unit (CPU), a microprocessor, or a multi-core processor), a memory 504 (e.g., random access memory (RAM) and/or read only memory (ROM)), a module 505 for implementing at least one modification to a set of execution requests from a plurality of radio access network functions in accordance with a reinforcement learning-based algorithm in response to identifying at least one conflict within the set of execution requests, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). In accordance with the present disclosure input/output devices 506 may also include antenna elements, antenna arrays, remote radio heads (RRHs), baseband units (BBUs), transceivers, power units, and so forth. Although only one processor element is shown, it should be noted that the computing device may employ a plurality of processor elements. Furthermore, although only one computing device is shown in the figure, if the method(s) as discussed above is/are implemented in a distributed or parallel manner for a particular illustrative example, i.e., the steps of the above method(s) is/are implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 502 can also be configured or programmed to cause other devices to perform one or more operations as discussed above. In other words, the hardware processor 502 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method(s). In one example, instructions and data for the present module or process 505 for implementing at least one modification to a set of execution requests from a plurality of radio access network functions in accordance with a reinforcement learning-based algorithm in response to identifying at least one conflict within the set of execution requests (e.g., a software program comprising computer-executable instructions) can be loaded into memory 504 and executed by hardware processor element 502 to implement the steps, functions, or operations as discussed above in connection with the illustrative method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 505 for implementing at least one modification to a set of execution requests from a plurality of radio access network functions in accordance with a reinforcement learning-based algorithm in response to identifying at least one conflict within the set of execution requests (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
receiving, by a processing system including at least one processor, a set of execution requests from a plurality of radio access network applications within a defined period of time, wherein each execution request of the set of execution requests is to perform at least one execution for configuring at least one aspect of a radio access network;
identifying, by the processing system, at least one conflict among at least two of the plurality of radio access network applications;
selecting, by the processing system, in response to the identifying the at least one conflict, at least one modification to the set of execution requests in accordance with a reinforcement learning-based algorithm, wherein the at least one modification comprises changing an order of executions associated with at least two of the execution requests of the set of execution requests; and
performing, by the processing system, at least a first execution associated with the set of execution requests according to the at least one modification to configure at least a first aspect of the radio access network.

2. The method of claim 1, wherein the processing system comprises a radio access network intelligent controller.

3. The method of claim 1, wherein the plurality of radio access network applications includes at least one of:
at least one open radio access network real-time application; or
at least one open radio access network non-real-time application.

4. The method of claim 1, further comprising:
obtaining a plurality of time series comprising metrics for a plurality of network performance indicators for the radio access network; and
identifying pairwise correlation values among the plurality of network performance indicators based upon portions of the plurality of time series associated with a correlation time period.

5. The method of claim 4, wherein the identifying of the at least one conflict comprises identifying that the at least two of the plurality of radio access network applications have respective goal functions that target respective network performance indicators having a negative pairwise correlation value with each other.

6. The method of claim 5, wherein the respective network performance indicators comprise at least two of:
an uplink throughput;
a downlink throughput;
an energy consumption;
a coverage measure; or
a spectral efficiency.

7. The method of claim 1, wherein the identifying of the at least one conflict comprises identifying that the at least two of the plurality of radio access network applications have respective goal functions that target a same network performance indicator.

8. The method of claim 1, wherein the identifying of the at least one conflict comprises identifying that the at least two of the execution requests in the set of execution requests are for configuring a same aspect of a radio access network.

9. The method of claim 1, wherein the at least one modification further comprises:
omitting an execution associated with at least one execution request of the set of execution requests.

10. The method of claim 1, wherein the at least one modification further comprises:
delaying at least one execution associated with at least one execution request of the set of execution requests.

11. The method of claim 1, wherein the reinforcement learning-based algorithm comprises a Q-table algorithm.

12. The method of claim 1, wherein the reinforcement learning-based algorithm comprises a deep neural network.

13. The method of claim 1, wherein the reinforcement learning-based algorithm is in accordance with a defined reward function.

14. The method of claim 13, wherein the reinforcement learning-based algorithm includes an exploration of modifications to sets of execution requests as candidate actions to identify changes in outcomes based upon the defined reward function.

15. The method of claim 14, wherein the exploration of modifications is in accordance with at least one constraint, and wherein the at least one constraint defines at least one of:
a maximum value or a minimum value for at least one network performance indicator; or
a maximum value or a minimum value for at least one configurable setting of the radio access network.

16. The method of claim 14, wherein the at least one modification is selected when it is determined via the reinforcement learning-based algorithm that the at least one modification provides an improved outcome in accordance with the defined reward function as compared to a non-modification of the set of execution requests.

17. The method of claim 13, wherein the reinforcement learning-based algorithm includes an exploration of modifications to the defined period of time.

18. A non-transitory computer-readable medium storing instructions which, when executed by a processing system including at least one processor, cause the processing system to perform operations, the operations comprising:
receiving a set of execution requests from a plurality of radio access network applications within a defined period of time, wherein each execution request of the set of execution requests is to perform at least one execution for configuring at least one aspect of a radio access network;
identifying at least one conflict among at least two of the plurality of radio access network applications;
selecting, in response to the identifying the at least one conflict, at least one modification to the set of execution requests in accordance with a reinforcement learning-based algorithm, wherein the at least one modification comprises changing an order of executions associated with at least two of the execution requests of the set of execution requests; and
performing at least a first execution associated with the set of execution requests according to the at least one modification to configure at least a first aspect of the radio access network.

19. An apparatus comprising:

a processing system including at least one processor; and a computer-readable medium storing instructions which, when executed by the processing system, cause the processing system to perform operations, the operations comprising:

receiving a set of execution requests from a plurality of radio access network applications within a defined period of time, wherein each execution request of the set of execution requests is to perform at least one execution for configuring at least one aspect of a radio access network;

identifying at least one conflict among at least two of the plurality of radio access network applications;

selecting, in response to the identifying the at least one conflict, at least one modification to the set of execution requests in accordance with a reinforcement learning-based algorithm, wherein the at least one modification comprises changing an order of executions associated with at least two of the execution requests of the set of execution requests; and performing at least a first execution associated with the set of execution requests according to the at least one modification to configure at least a first aspect of the radio access network.

20. The apparatus of claim 19, wherein the plurality of radio access network applications includes at least one of:

at least one open radio access network real-time application; or at least one open radio access network non-real-time application.

\* \* \* \* \*